(12) United States Patent
Schlenker et al.

(10) Patent No.: US 10,661,404 B2
(45) Date of Patent: May 26, 2020

(54) SEALING SYSTEM FOR A SURFACE TREATMENT MACHINE

(71) Applicant: Caterpillar Paving Products Inc., Brooklyn Park, MN (US)

(72) Inventors: Brian Schlenker, Shoreview, MN (US); Dustin Sondreal, Hanover, MN (US); Jason Muir, Andover, MN (US); Dario Sansone, Castello d'Argile (IT); Roger Hedlund, Champlin, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 159 days.

(21) Appl. No.: 15/848,794

(22) Filed: Dec. 20, 2017

(65) Prior Publication Data

US 2019/0184509 A1    Jun. 20, 2019

(51) Int. Cl.
| | | |
|---|---|---|
| *B23Q 5/10* | (2006.01) | |
| *F16J 15/16* | (2006.01) | |
| *F04C 15/00* | (2006.01) | |
| *F16C 33/78* | (2006.01) | |
| *F16C 33/80* | (2006.01) | |
| *F16C 19/38* | (2006.01) | |

(52) U.S. Cl.
CPC .............. *B23Q 5/10* (2013.01); *F04C 15/008* (2013.01); *F16C 33/7883* (2013.01); *F16C 33/7886* (2013.01); *F16C 33/80* (2013.01); *F16J 15/164* (2013.01); *F16C 19/38* (2013.01); *F16C 19/386* (2013.01); *F16C 2320/23* (2013.01)

(58) Field of Classification Search
CPC .......... B23Q 5/10; F04C 15/008; F16J 15/164
See application file for complete search history.

(56) References Cited

U.S. PATENT DOCUMENTS

| | | | | |
|---|---|---|---|---|
| 3,778,070 | A * | 12/1973 | Shimura ................. | F16J 15/164 277/348 |
| 5,979,903 | A * | 11/1999 | Kwasniewski ...... | F16J 15/3256 277/423 |
| 6,234,489 | B1 * | 5/2001 | Orlowski ............. | F16J 15/3264 277/395 |
| 6,328,528 | B1 * | 12/2001 | Dahlheimer .......... | F04D 29/126 277/370 |
| 7,722,050 | B2 | 5/2010 | Roddis | |
| 8,047,548 | B2 | 11/2011 | Roddis | |
| 8,056,902 | B2 | 11/2011 | Roddis et al. | |
| 8,136,817 | B2 * | 3/2012 | Kobayashi ............... | H02K 5/10 277/346 |

(Continued)

FOREIGN PATENT DOCUMENTS

| | | | | |
|---|---|---|---|---|
| JP | 2014240676 | A * | 12/2014 | .......... F16C 33/7876 |
| JP | 2015059646 | A * | 3/2015 | .......... F16C 33/7889 |

*Primary Examiner* — Eugene G Byrd
(74) *Attorney, Agent, or Firm* — Bookoff McAndrews

(57) ABSTRACT

A seal system for a rotor assembly of a surface treatment machine includes a rotatable rotor assembly shell including surface treatment tools extending therefrom, and a stub-shaft located within the shell and fixedly coupled to the shell. The stub-shaft includes a shaft portion and a base portion, with the base portion including a recess. A non-rotatable bearing housing surrounds at least a portion of the shaft portion and has an longitudinally extending inner end located within the recess. A seal member is located in the recess and secured between the bearing housing and the base portion.

20 Claims, 3 Drawing Sheets

(56) References Cited

U.S. PATENT DOCUMENTS

| | | | |
|---|---|---|---|
| 8,506,170 B2* | 8/2013 | Hosmer | F16C 33/76 |
| | | | 384/477 |
| 8,844,935 B2* | 9/2014 | Redin | F16J 15/164 |
| | | | 277/351 |
| 9,587,743 B2* | 3/2017 | Jaskot | F16J 15/4476 |
| 2007/0222158 A1* | 9/2007 | Roddis | F16C 23/086 |
| | | | 277/345 |
| 2007/0241513 A1 | 10/2007 | Roddis | |
| 2008/0106042 A1 | 5/2008 | Roddis | |
| 2010/0181730 A1 | 7/2010 | Roddis | |
| 2010/0201075 A1 | 8/2010 | Roddis | |
| 2016/0229470 A1* | 8/2016 | Suzuki | F16C 33/7889 |
| 2018/0023682 A1* | 1/2018 | Reineberg | F16J 15/002 |
| | | | 277/572 |
| 2018/0195558 A1* | 7/2018 | Kato | F16C 33/7879 |

\* cited by examiner

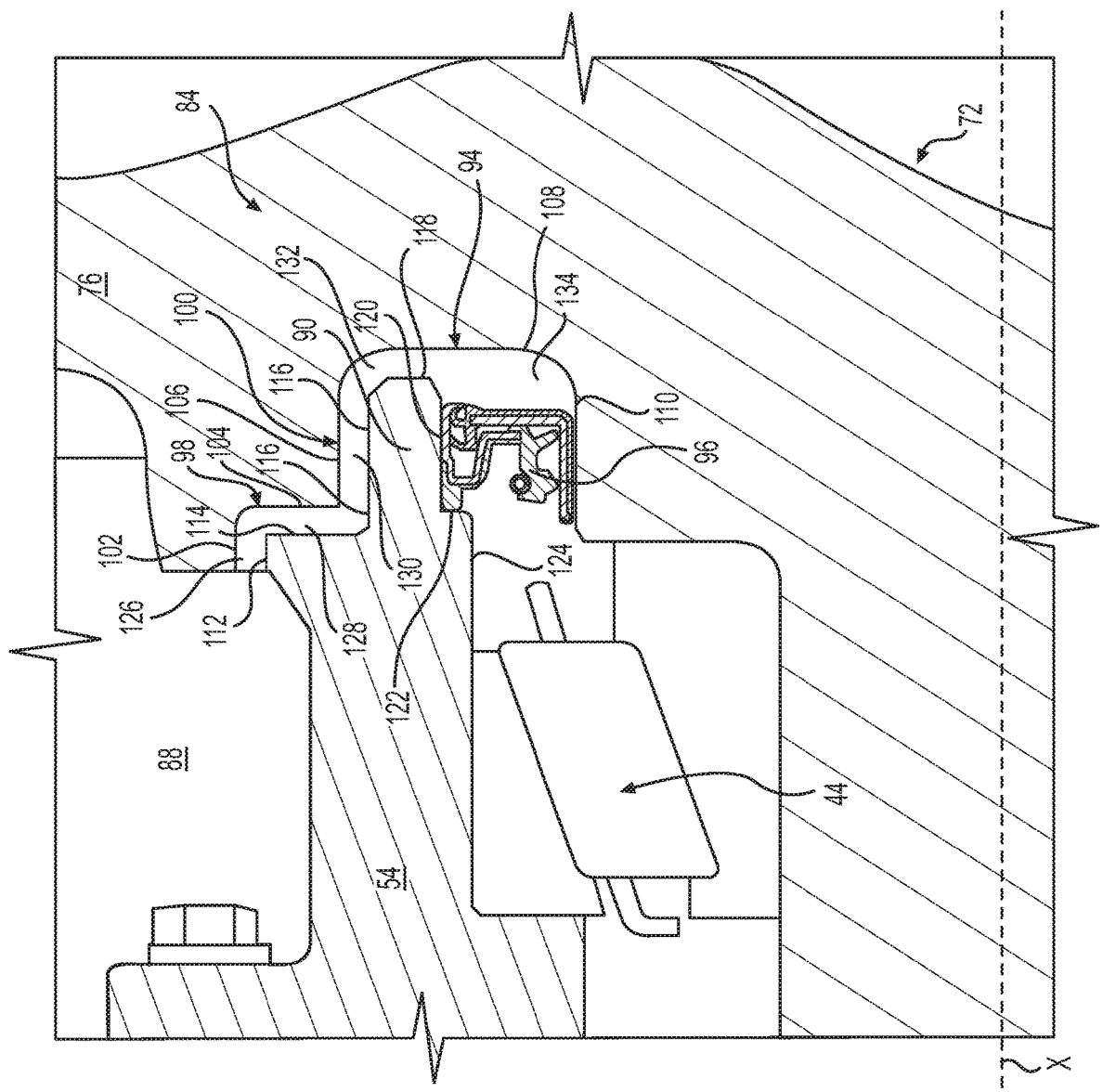

SEALING SYSTEM FOR A SURFACE TREATMENT MACHINE

TECHNICAL FIELD

The present disclosure relates generally to surface treatment machines, and more particularly, to seal arrangements for rotor assemblies of such machines.

BACKGROUND

Surface treatment machines including rotary mixers and cold planers may be used to reclaim, or mill, a ground surface as part of road reclamation, road paving, or soil stabilization. Such surface treatment machines include a rotor assembly having a rotor chamber housing a rotatable rotor. The rotor is configured to rotate about an axis generally horizontal to the ground surface and may be lowered to a predetermined depth so the rotor, while spinning, pulverizes a portion of the ground surface. As the rotor pulverizes the ground surface, debris and particulates travel throughout the rotor chamber. Small particles can infiltrate spaces between rotating and non-rotating components of the machine, causing wear and rotational resistance. Frequent maintenance may be required on the rotational interfaces of such machines.

U.S. Pat. No. 8,056,902 to Roddis et al. describes an isolator cartridge seal for use between rotating and non-rotating components. The seal includes a lip for preventing the ingress or egress of fluids or solids into a cavity. The seal arrangement described by the '902 patent includes a static shut-off device which disengages with one or more of a rotor assembly or stator when the rotor assembly is dynamic. While the sealing arrangement described by the '902 patent may be beneficial, such a sealing system may not provide sufficient sealing for use as a rotor assembly seal arrangement in surface treatment machines.

The rotor assembly seal arrangement of the present disclosure may solve one or more of the problems set forth above and/or other problems in the art. The current scope of the disclosure, however, is defined by the attached claims and not by the ability to solve any specific problem.

SUMMARY OF THE DISCLOSURE

According to one aspect of the present disclosure, a seal system for a rotor assembly of a surface treatment machine includes a rotatable rotor assembly shell including surface treatment tools extending therefrom, and a stub-shaft located within the shell and fixedly coupled to the shell. The stub-shaft includes a shaft portion and a base portion, with the base portion including a recess. A non-rotatable bearing housing surrounds at least a portion of the shaft portion and has an longitudinally extending inner end located within the recess. A seal member is located in the recess and secured between the bearing housing and the base portion.

According to another aspect of the present disclosure, seal system for a rotor assembly of a surface treatment machine includes a rotatable rotor assembly shell having surface treatment tools extending therefrom. A stub-shaft is located within the shell, is fixedly coupled to the shell, and includes a shaft portion and a base portion, with the base portion including a recess. A non-rotatable bearing housing surrounds at least a portion of the shaft portion, with a longitudinally extending inner end located within the recess. The longitudinally extending inner end and the recess form a gap having a plurality of longitudinally extending portions and a plurality of radially extending portion, with seal member located in the gap.

According to yet another aspect of the present disclosure, A seal system for a rotor assembly of a surface treatment machine includes a rotatable rotor assembly shell including surface treatment tools extending therefrom. A stub-shaft is located within the shell and fixedly coupled to the shell, the stub-shaft having a shaft portion and a base portion, with the base portion including a recess. A non-rotatable bearing housing surrounds at least a portion of the shaft portion and has a longitudinally extending inner end located within the recess. The longitudinally extending inner end and the recess form a gap having a plurality of longitudinally extending portions and a plurality of radially extending portion. A seal member is located in the recess and secured between the bearing housing and the base portion in one of the plurality of longitudinally extending portions. The seal system further includes a sealing configuration located within the rotatable shell at an longitudinally outer end of the rotatable shell.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3 illustrates an exemplary seal arrangement of the rotor assembly of FIG. 2.

DETAILED DESCRIPTION

Surface treatment machines may be used for reclaiming, milling, stabilizing, or otherwise manipulating ground surfaces. A rotary mixer or road reclaimer type surface treatment machine will be described in this disclosure, however, it is understood that this disclosure is applicable to other types of surface treatment machines, such as cold planers, or other milling machines. As disclosed herein, the term "ground surface" is used broadly to refer to all types of surfaces that form typical roadways (e.g., asphalt, cement, clay, sand, dirt, etc.) or surfaces that can be conditioned to form roadways. In this disclosure, relative terms such as, for example, "about," "approximately," "substantially," and "generally" are used to indicate a possible variation of ±10% in a stated value or characteristic. Further, it is understood that references to rotating and non-rotating components are exemplary, and that such a reference includes components that move relative to one another, and thus non-rotating is not limited to only stationary components.

Figure 1:
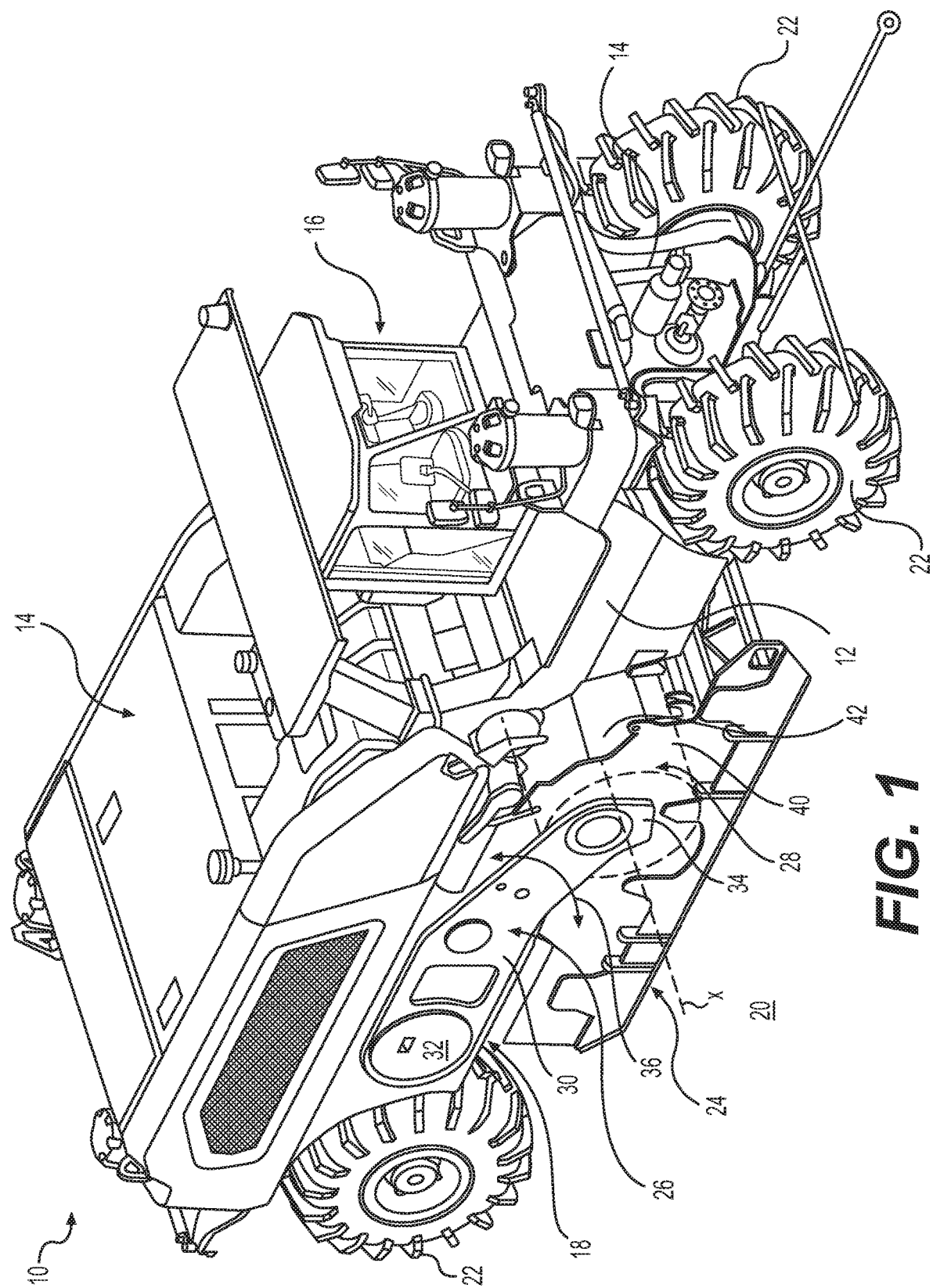
FIG. 1 illustrates a rotary mixer machine according to the present disclosure.

FIG. 1 illustrates a rotary mixer machine 10 including a frame 12 supporting a power system 14, an operator station 16, and a propulsion system 18. The frame 12 may be supported on a ground surface 20 by two sets of ground engaging members 22. In the example illustrated in FIG. 1, the ground engaging members 22 are wheels. It is understood that other types of ground engaging members may be used, such as tracks. The ground engaging members 22 may be driven by power transmitted from the power system 14 through the propulsion system 18.

The power system 14 may include an internal combustion engine (e.g. a gasoline engine, a diesel engine, or an engine configured to utilize a gas—e.g. natural gas), an electric power system (e.g., rechargeable batteries), or a hybrid power system using both an internal combustion engine and an electric power system. The propulsion system 18 may include mechanical, electrical and/or hydraulic drive components that receive power from the power system 14 to drive the ground engaging members 22. For example, the propulsion system 18 may include a mechanical transmission and/or electrical motors operatively connected to the power system 14. Alternatively or additionally, the propulsion system 18 may include one or more hydraulic pumps that pressurize and direct fluid to drive a fluid motor coupled to the ground engaging members 22.

Rotary mixer 10 may also include a rotor assembly 24 having a swing arm assembly 26 and a ground-engaging drum assembly 28 (shown in dashed lines in FIG. 1). Swing arm assembly 26 may include a pair of swing arms 30 located on opposite sides of the frame 12 (only one shown in FIG. 1). The swing arms 30 may be pivotably coupled to the frame 12 at a first end 32, and coupled to the drum assembly 28 at a second, opposite end 34. Power transmitted from the power system 14 may pivot the swing arms 30 in unison in the directions shown by arrow 36, thereby raising or lowering the drum assembly 28 into the ground surface 20. For example, power system 14 may be used to drive one or more fluid actuators (not shown) to control the position of the swing arm assembly 26. Power system 14 may also provide power to rotate drum assembly 28 about a rotor axis "x" to drive rotor bits 38 (FIG. 2) of the drum assembly 28 into the ground surface 20. The rotational power provided to the drum assembly 28 by the power system 14 may be transmitted in any appropriate manner, such as by mechanical or hydraulic components (not shown).

Figure 2:
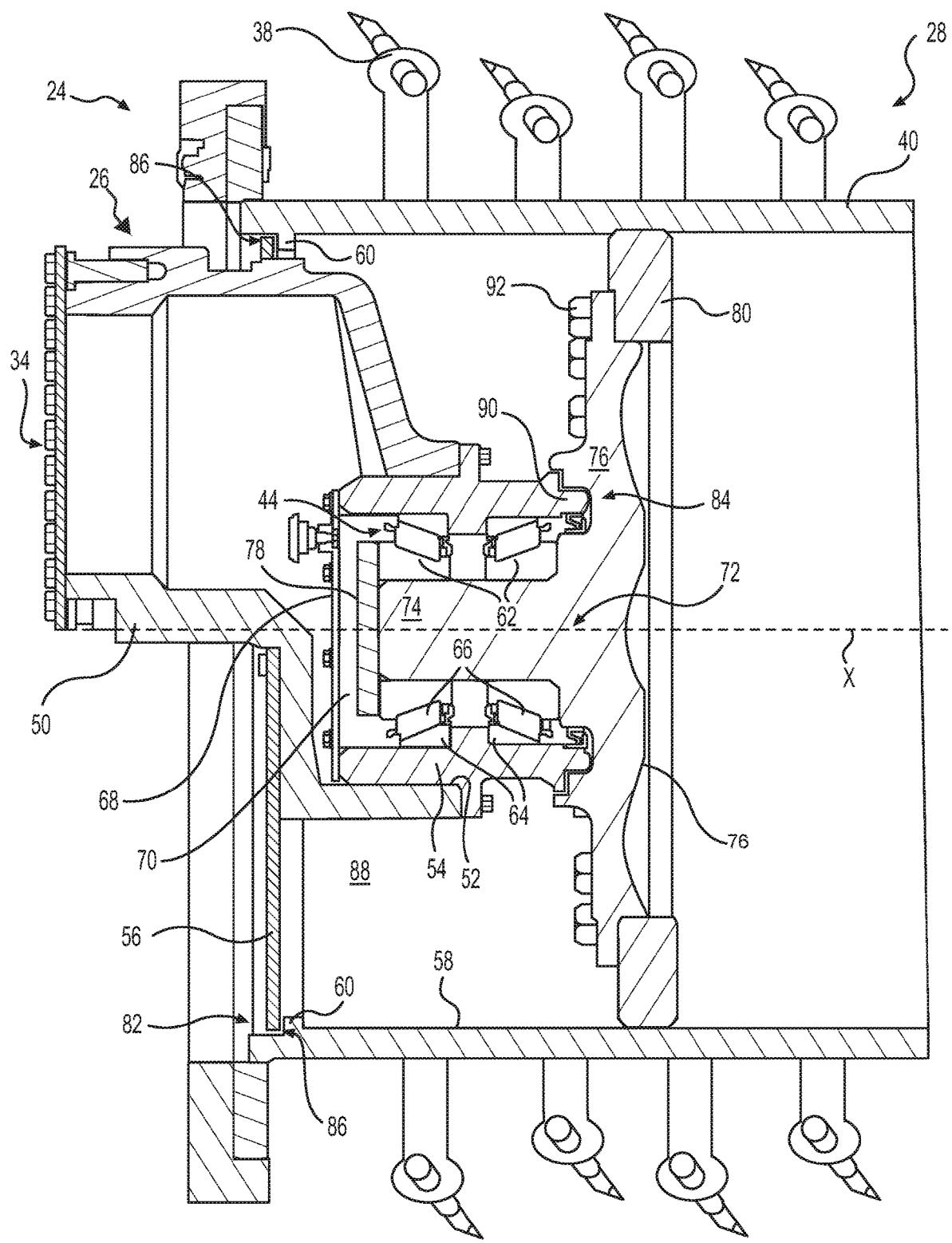
FIG. 2 illustrates portions of an exemplary rotor assembly of the rotary mixer machine of FIG. 1.

The drum assembly 28 may include, among other components, a cylindrically-shaped shell 40, and a plurality of surface treatment tools, such as rotor bits 38 coupled to an outer surface of the shell 40 (FIG. 2). The drum assembly 28 may be enclosed within a series of walls forming a rotor chamber 42. During operation, as the drum assembly 28 rotates about the x-axis digging into the ground surface 20, the rotor chamber 42 forms a barrier that retains much of the ground and other debris produced by the engagement of the rotor bits 38 with the ground surface 20.

FIG. 2 illustrates an exemplary cross-section of a portion of the rotor assembly 24 (including end 34 of the swing arm assembly 26), and an end portion of the drum assembly 28. As used herein, the term "inner" refers to a direction more internal to the rotor assembly 24 (to the right in FIG. 2), and the term "outer" refers to a position more external to the rotor assembly 24 (to the left in FIG. 2). The portion of the drum assembly 28 depicted in FIG. 2 is an end opposite the end that is driven by the power system 14 to rotate the drum assembly 28. The drum assembly 28 is supported by the swing arm assembly 26 via a bearing assembly 44, so as to allow relative rotation between the drum assembly 28 and the swing arm assembly 26.

As shown in FIG. 2, the swing arm assembly 26 may further include a hub 50 having an inner open end 52 for fixedly receiving an outer end of a bearing housing 54. The hub 50 may also include a circular sealing plate 56 fixedly secured to a central portion of the hub 50. The sealing plate 56 may extend radially to an inner surface 58 of the shell 40 at a location adjacent a radial extension 60 of shell 40. Thus, the hub 50, bearing housing 54, and sealing plate form the primary non-rotating features of the rotor assembly 24.

The bearing assembly 44 can include a pair of tapered roller bearings as shown, having inner races 62, outer races 64, and rollers 66 between the races 62, 64. While tapered roller bearings are shown, it is understood that any other appropriate bearing assembly may be included. The outer races 64 of bearing assembly 44 may be fixedly secured to a radially inner surface of the bearing housing 54. A cap 68 may be fixedly secured to the outer end of bearing housing 54. As will be explained in further detail below, the bearing housing 54 and cap 68 form a cavity 70 for retaining lubricant (e.g., grease) for the bearing assembly 44.

The inner race 62 of bearing assembly 44 may be fixedly secured to a rotatable stub-shaft 72 of drum assembly 28. The stub-shaft 72 may include a shaft portion 74 and a base portion 76. The shaft portion 74 of the stub-shaft 72 may extend outwardly into bearing housing 54 and terminate proximate the outer-most inner race 62 of the bearing assembly 44. An end cap 78 may be secured to the end of shaft portion 74 and extend radially outwardly to abut the outer-most inner race 62 of the bearing assembly 44 to assist in securing the bearing assembly 44 in place. The base portion 76 of the stub-shaft 72 may extend radially outward and may be fixedly secured (via e.g., bolts 92) at its periphery to a bulkhead 80 that is fixed the inner surface 58 of shell 40. The stub-shaft 72 may be located completely within the shell 40 of the drum assembly 28. Thus, the shell 40, bulkhead 80, and stub-shaft 72 form the primary rotating components of the rotor assembly 24 shown in FIG. 2.

The drum assembly 28 and hub assembly 50 form a rotating—non-rotating interface, and a sealing system at the interface. The sealing system includes two sealing configurations, a first sealing configuration 82 at a first rotational interface, and a second sealing configuration 84 at a second rotational interface. The first sealing configuration 82 is formed between plate 56 of the hub 50, and the inner surface 58 of shell 40. In particular, radial extension 60 of shell 40 radially overlaps plate 56 to form an "L" shaped gap or path 86 therebetween. This restricted path 86 to an inner cavity 88 of the drum assembly 28 helps block contaminates from entering the interior of drum assembly 28.

The second sealing configuration 84 is formed between an inner end portion 90 of bearing housing 54, and the base portion 76 of the stub-shaft 72. As best shown in FIG. 3, a contoured recess 94 may be formed in an outer-facing surface of base portion 76, with recess 94 shaped to receive the inner end portion 90 of the bearing housing 54. A seal member 96 may be included in a gap formed between contoured recess 94 and the inner end portion 90 of bearing housing 54.

The contoured recess 94 may include a radially outer circumferential indentation 98, and a radially inner circumferential indentation 100. Radially outer indentation 98 may be smaller (in a longitudinal or inner direction) than the radially inner indentation 100, so that the radially inner indentation 100 forms a deeper indentation in the base portion 76 than the radially outer indentation 98. Radially outer indentation 98 may include an outer surface 102 extending generally parallel to the x-axis, and a radially inner surface 104 extending from outer surface 102 and extending generally perpendicular to the x-axis. Radially inner indentation 100 may extend from radially inner surface 104, and may include a radially outer surface 106 extending generally parallel to the x-axis, and a radially inner surface 108 extending from radially outer surface 106 and extending generally perpendicular to the x-axis. Radially inner indentation 100 may further include a radially inner surface 110 extending from radially inner surface 108, and extending generally parallel to the x-axis.

Inner end portion 90 of bearing housing 54 includes a radially outer surface and a radially inner surface. The radially outer surface may include a first surface 112, extending generally parallel to the x-axis, and a second surface 114 extending radially inner from first surface 112 and extending generally perpendicular to the x-axis. The radially outer surface of the inner end portion 90 of the bearing housing 54 may further include a third surface 116 extending from the second surface 114 in a direction generally parallel to the x-axis. An end-most surface 118 of bearing housing 54 extends from the third surface 116 in a direction generally perpendicular to the x-axis. The radially inner surface of the inner end portion 90 of bearing housing 54 includes a fifth surface 120 extending from the fourth surface 118 and generally parallel to the x-axis. Finally, the radially inner surface of inner end portion 90 of bearing housing 54 may include a sixth surface 122 extending from the fifth surface 120 and extending generally perpendicular to the x-axis and, and a seventh surface 124 extending from sixth surface 122 and extending generally parallel to the x-axis.

As shown in FIG. 3, the walls of inner end portion 90 of bearing housing 54 may extend generally parallel to the walls of the contoured recess 94 in base portion 76. Seal member 96 may be included within radially inner indentation 100, between the fifth surface 120 of the bearing housing, and the radially inner surface 110 of the radially inner indentation. Sixth surface 122 of the bearing housing 54 may form a shoulder for abutting/positioning the seal member 96. Further, as shown in FIG. 3, the shoulder formed by sixth surface 122 may be located longitudinally within the radially inner indentation 100. It is understood, however, that seal member 96 may be located between other surfaces of the bearing housing 54 and the base portion 76, and more than one seal member may be included.

Thus, as show in FIG. 3, the inner end portion 90 of the bearing housing 54 and the contoured recess 94 may together form a rotational interface having an associated gap or clearance therebetween. The gap may include a first longitudinally extending portion 126 connected to a first radially extending portion 128, a second longitudinally extending portion 130 connected to the first radially extending portion 128, and to a second radially extending portion 132. The gap further includes a third longitudinally extending portion 134 connected to the second radially extending portion 132, and the seal member 96 may be located in the third longitudinally extending portion 134.

Seal member 96 may be a conventional cartridge seal having a radially inner rotating component and a radially outer stationary component, and my be secured via an interference fit. The seal member 96 may alternatively include a different type of seal, for example a lip seal, or other conventional seal member type.

INDUSTRIAL APPLICABILITY

The disclosed sealing system may be applicable to surface treatment machines, or any other machine having one or more interfaces between rotating and non-rotating components. The disclosed sealing system helps to limit harmful dirt and debris from entering internal components of a machine, such as a bearing cavity of the machine.

During operation of the rotary mixer machine 10 of the present disclosure, the rotating drum assembly 28 pulverizes or otherwise breaks up portions of the ground surface 20 to produce reclaimed material within the rotor chamber 42. This reclaimed material moves within rotor chamber with significant force, which urges the material against the rotational interfaces within the rotor chamber 42. The first and second sealing configurations (82, 84) help to reduce the amount of particulates that enter the inner cavity 88 of the drum assembly 28, and the bearing cavity 70. By reducing the material that enters these cavities (88, 70), the machine 10 may experience reduced wear and thus reduced maintenance.

It will be apparent to those skilled in the art that various modifications and variations can be made to the disclosed system without departing from the scope of the disclosure. Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for a rotor assembly of a surface treatment machine, comprising:
   a rotatable rotor assembly shell including surface treatment tools extending therefrom;
   a stub-shaft located within the shell and fixedly coupled to the shell, the stub-shaft having a shaft portion and a base portion, the base portion including a recess;
   a non-rotatable bearing housing surrounding at least a portion of the shaft portion and having a longitudinally extending inner end located within the recess; and
   a seal member located in the recess and secured between the bearing housing and the base portion.

2. The system of claim 1, wherein the recess comprises a radially outer indentation, and a radially inner indentation, and the seal member is located in the radially inner indentation.

3. The system of claim 2, wherein the longitudinally extending inner end of the bearing housing includes a radially outer surface, and a radially inner surface, and the seal member is located between the radially inner surface and a wall of the radially inner indentation.

4. The system of claim 3, wherein the radially outer surface of the longitudinally extending inner end of the bearing housing includes a plurality of walls extending generally parallel to walls of the radially outer indentation and the radially inner indentation.

5. The system of claim 4, wherein the radially inner surface of the longitudinally extending inner end of the bearing housing includes a wall extending generally parallel to a wall of the radially inner indentation.

6. The system of claim 5, wherein the radially outer indentation is smaller than the radially inner indentation.

7. The system of claim 6, wherein the seal member includes a cartridge seal.

8. The system of claim 2, further including a sealing configuration located longitudinally outside the seal member, the seal configuration including a stationary plate and an inner shell extension.

9. The system of claim 1, wherein the longitudinally extending inner end of the bearing housing forms a gap with the recess, the gap having:
   a first longitudinally extending portion connected to a first radially extending portion,
   a second longitudinally extending portion connected to the first radially extending portion and to a second radially extending portion.

10. The system of claim 9, wherein the gap further includes a third longitudinally extending portion connected to the second radially extending portion, and the seal member is located in the third longitudinally extending portion.

11. The system of claim 1, wherein the stub-shaft is located completely within the rotor assembly shell.

12. A system for a rotor assembly of a surface treatment machine, comprising:
   a rotatable rotor assembly shell including surface treatment tools extending therefrom;
   a stub-shaft located within the shell and fixedly coupled to the shell, the stub-shaft having a shaft portion and a base portion, the base portion including a recess;
   a non-rotatable bearing housing surrounding at least a portion of the shaft portion and having a longitudinally extending inner end located within the recess, the longitudinally extending inner end and the recess forming a gap having a plurality of longitudinally extending portions and a plurality of radially extending portion;
   a seal member located in the gap; and
   a sealing configuration located longitudinally outside the seal member, the system including a non-rotatable plate and a radial extension of the rotatable shell.

13. The system of claim 12, wherein the seal member is coupled to an inner surface of the bearing housing.

14. The system of claim 12, wherein the seal member includes a cartridge seal.

15. A system for a rotor assembly of a surface treatment machine, comprising:
   a rotatable rotor assembly shell including surface treatment tools extending therefrom;
   a stub-shaft located within the shell and fixedly coupled to the shell, the stub-shaft having a shaft portion and a base portion, the base portion including a recess;
   a non-rotatable bearing housing surrounding at least a portion of the shaft portion and having a longitudinally extending inner end located within the recess, the longitudinally extending inner end and the recess forming a gap having a plurality of longitudinally extending portions and a plurality of radially extending portion;
   a seal member located in the recess and secured between the bearing housing and the base portion in one of the plurality of longitudinally extending portions; and
   a sealing configuration located within the rotatable shell at an longitudinally outer end of the rotatable shell, wherein the sealing configuration is located radially outside with respect to the seal member and includes a non-rotatable plate and a radial extension of the shell.

16. The system of claim 15, wherein the seal member includes a cartridge seal.

17. The system of claim 16, wherein the stub-shaft is located completely within the rotor assembly shell.

18. The system of claim 1, wherein the rotatable rotor assembly is rotatable to cause the surface treatment tools to contact a ground surface.

19. The system of claim 1, wherein the surface treatment tools include bits connected to the shell.

20. The system of claim 1, wherein the surface treatment tools include bits connected to the shell that are configured to enter into a ground surface due to a rotation of the rotatable rotor assembly.

* * * * *